(12) United States Patent
Komatsu

(10) Patent No.: US 11,369,128 B2
(45) Date of Patent: Jun. 28, 2022

(54) INGREDIENT-CONTAINING LIQUID SEASONING

(71) Applicants: MIZKAN HOLDINGS CO., LTD., Aichi (JP); MIZKAN CO., LTD., Aichi (JP)

(72) Inventor: Kazuki Komatsu, Aichi (JP)

(73) Assignees: MIZKAN HOLDINGS CO., LTD., Aichi (JP); MIZKAN CO., LTD., Aichi (JP)

( * ) Notice: Subject to any disclaimer, the term of this patent is extended or adjusted under 35 U.S.C. 154(b) by 0 days.

(21) Appl. No.: 16/926,201

(22) Filed: Jul. 10, 2020

(65) Prior Publication Data

US 2020/0337347 A1    Oct. 29, 2020

Related U.S. Application Data

(63) Continuation of application No. PCT/JP2019/000314, filed on Jan. 9, 2019.

(30) Foreign Application Priority Data

Jan. 10, 2018 (JP) .............................. JP2018-001719

(51) Int. Cl.
*A23L 27/12* (2016.01)
*A23L 27/14* (2016.01)
*A23L 29/212* (2016.01)
*A23L 29/25* (2016.01)

(52) U.S. Cl.
CPC .............. *A23L 27/12* (2016.08); *A23L 27/14* (2016.08); *A23L 29/212* (2016.08); *A23L 29/25* (2016.08)

(58) Field of Classification Search
CPC ........ A23L 27/12; A23L 27/14; A23L 29/212; A23L 29/25
USPC ........................................................ 426/650
See application file for complete search history.

(56) References Cited

U.S. PATENT DOCUMENTS

| | | | |
|---|---|---|---|
| 2018/0317533 A1* | 11/2018 | Ohike | .................. A23L 29/269 |
| 2020/0138070 A1* | 5/2020 | Ohike | .................... A23L 33/24 |

FOREIGN PATENT DOCUMENTS

| | | | | |
|---|---|---|---|---|
| EP | 3398451 | A1 | 11/2018 | |
| EP | 3403514 | A1 | 11/2018 | |
| JP | H11-130 | A | 1/1999 | |
| JP | 2006254803 | A | 9/2006 | |
| JP | 2013042725 | A | 3/2013 | |
| JP | 201359340 | A | 4/2013 | |
| JP | 2013074851 | A * | 4/2013 | |
| JP | 2013074851 | A | 4/2013 | |
| JP | 2016168008 | A | 9/2016 | |
| JP | 2017118830 | A | 7/2017 | |
| JP | 2017123817 | A * | 7/2017 | ............. A23L 25/30 |
| JP | 2017123817 | A | 7/2017 | |
| SG | 11201510674 | U | 1/2016 | |

OTHER PUBLICATIONS

Translation of Obata et al. (JP-2013074851-A). (Year: 2013).*
Translation of Ohike (JP-2017123817-A) (Year: 2017).*
International Search Report issued in International Application No. PCT/JP2019/000314, dated Apr. 9, 2019 (2 pages).
Written Opinion of the International Searching Authority issued in International Application No. PCT/JP2019/000314, dated Apr. 9, 2019 (7 pages).
Written Opinion of the Intellectual Property Office of Singapore issued in corresponding Singaporean Application No. 11202006607U; dated Nov. 10, 2021 (10 pages).
Extended European Search Report issued in European Application No. 19738176.7, dated Sep. 9, 2021 (3 pages).

* cited by examiner

*Primary Examiner* — Brent T O'Hern
(74) *Attorney, Agent, or Firm* — Osha Bergman Watanabe & Burton LLP

(57) ABSTRACT

A liquid seasoning contains ingredients that reduce changes in color and smell during preservation. The liquid seasoning has (A) a solid ingredient, (B) a water-insoluble powder, (C) a component selected from the group consisting of a fruit juice, a vegetable juice, a colorant, and combinations thereof, and (D) a viscosity adjuster.

2 Claims, No Drawings

INGREDIENT-CONTAINING LIQUID SEASONING

TECHNICAL FIELD

One or more embodiments of the present invention relate to an ingredient-containing liquid seasoning which has fruit juice feeling and a presence of ingredients, with changes in color and smell during preservation being reduced.

BACKGROUND

Conventionally, seasonings having various tastes or forms have been used in salads or prepared foods. Among others, a liquid seasoning containing a processed fruit product such as fruit peel and fruit juice in its seasoning liquid has a vivid color tone and a fruity flavor peculiar to fruit and satisfies diversifying preferences of consumers.

However, in a seasoning to which fruit peel or fruit juice is added, a content thereof is increased in order to provide its color tone and presence. Meanwhile, fruit peel and fruit juice are likely to discolor during preservation, and their flavors also decline to cause occurrence of off-flavors. In addition, when a large amount of fruit peel or fruit juice is contained, a flavor balance of an entire seasoning deteriorates.

Various means for reducing changes in color and flavor have been proposed for foods and beverages containing fruit peel or fruit juice. For example, Patent Literature 1 proposes, with respect to a lemon juice containing a water-insoluble solid content (pulp content), suppressing chronological precipitation and browning of the water-insoluble solid content in the lemon juice by adjusting a median diameter of the water-insoluble solid content to be within a certain range to provide a lemon juice having good appearance, and a food and beverage containing the same. However, physical treatment or chemical treatment is required for adjusting the size of the water-insoluble solid content, and production efficiency decreases. In addition, Patent Literature 2 proposes preventing change in quality of citrus peel flavor or ginger flavor by mixing a hot water extract of sesame and an alkali material to an acidic liquid food to which citrus peel or ginger is mixed. However, in this method, although change in quality of flavor can be suppressed, a color tone and presence of ingredients are unsatisfactory.

PATENT LITERATURE

Patent Literature 1: JP Patent Publication (Kokai) No. 2017-118830

Patent Literature 2: JP Patent Publication (Kokai) No. 2013-59340

SUMMARY

One or more embodiments of the present invention provide an ingredient-containing liquid seasoning which has fruit juice feeling and a presence of ingredients, with changes in color and smell during preservation being reduced.

The present inventors have found that by virtue of mixing water-insoluble powder, a viscosity adjuster, and at least one selected from a fruit juice, a vegetable juice, and a colorant into a liquid seasoning together with an ingredient having a vivid color tone such as fruit peel and fruit pulp, in both cases when the liquid seasoning is present in a container and when the liquid seasoning is after being taken out of the container, the liquid seasoning exhibits a vivid color tone and has fruit juice feeling, the ingredient is conspicuous in a seasoning liquid and the liquid seasoning has a presence of the ingredient. Also, the present inventors have found that changes in color and smell during preservation of the seasoning liquid are reduced. The above findings have led to the completion of one or more embodiments of the present invention. The term "fruit juice feeling" in one or more embodiments of the present invention means original color tone feeling of an ingredient, which is natural and vivid and which has appropriate turbidity as fruit juice obtained by squeezing a natural fruit.

That is, one or more embodiments of the present invention encompasses the following.

(1) An ingredient-containing liquid seasoning, comprising: (A) an ingredient; (B) water-insoluble powder; (C) at least one selected from a fruit juice, a vegetable juice, and a colorant; and (D) a viscosity adjuster.

(2) The ingredient-containing liquid seasoning according to (1), wherein the ingredient is fruit peel and/or fruit pulp.

(3) The ingredient-containing liquid seasoning according to (1) or (2), wherein the water-insoluble powder is cereal powder.

(4) The ingredient-containing liquid seasoning according to (3), wherein the cereal powder is at least one selected from soybean curd residue powder, soybean powder, roasted soybean flour, rice powder, cornmeal, and amaranth powder.

(5) The ingredient-containing liquid seasoning according to any of (1) to (4), wherein the viscosity adjuster is at least one selected from a gum and a modified starch.

(6) The ingredient-containing liquid seasoning according to any of (1) to (5), wherein a content of the water-insoluble powder in the liquid seasoning is 0.05% to 3.0% by mass.

(7) The ingredient-containing liquid seasoning according to any of (1) to (6), wherein a viscosity measured by a B-type viscometer at ordinary temperature is 500 mP·s or more.

(8) The ingredient-containing liquid seasoning according to (6), wherein the content of the water-insoluble powder in the liquid seasoning is 0.05% to 2.0% by mass.

(9) The ingredient-containing liquid seasoning according to (6), wherein the content of the water-insoluble powder in the liquid seasoning is 0.05% to 0.7% by mass.

(10) The ingredient-containing liquid seasoning according to (7), wherein a viscosity measured by a B-type viscometer at 20° C. is 500 mPa·s or more.

(11) The ingredient-containing liquid seasoning according to (7), wherein a viscosity measured by a B-type viscometer at 20° C. is 500 to 8000 mPa·s.

(12) A method for enhancing a color tone of an entire liquid seasoning and a presence of an ingredient in an ingredient-containing liquid seasoning, the method comprising: mixing water-insoluble powder, at least one selected from a fruit juice, a vegetable juice, and a colorant, and a viscosity adjuster to a liquid seasoning including an ingredient.

(13) A method for enhancing a color tone of an entire liquid seasoning and a presence of an ingredient in an ingredient-containing liquid seasoning and reducing changes in color and smell during preservation, the method comprising: mixing water-insoluble powder, at least one selected from a fruit juice, a vegetable juice, and a colorant, and a viscosity adjuster to a liquid seasoning including an ingredient.

(14) The method according to (12) or (13), wherein the ingredient is fruit peel and/or fruit pulp; the cereal powder is at least one selected from soybean curd residue powder, soybean powder, roasted soybean flour, rice powder, cornmeal, and amaranth powder; and the viscosity adjuster is at least one selected from a gum and a modified starch.
(15) The method according to any of (12) to (14), wherein a content of the water-insoluble powder in the liquid seasoning is 0.05% to 3.0% by mass, and a viscosity measured by a B-type viscometer at ordinary temperature is 500 to 8000 mPa·s.
(16) A method for producing the ingredient-containing liquid seasoning according to any of (1) to (11), the method comprising the following steps (a) to (c):
 (a) a step of putting raw materials including (A) an ingredient, (B) water-insoluble powder, (C) at least one selected from a fruit juice, a vegetable juice, and a colorant, and (D) a viscosity adjuster into water,
 (b) a step of mixing and stirring a raw material-containing liquid obtained in step (a) without heating or while heating so that a temperature of the raw material-containing liquid becomes 20 to 95° C. until a homogeneous liquid is obtained, and
 (c) leaving or cooling a mixed liquid obtained in step (b) until a temperature of the mixed liquid becomes room temperature (15 to 25° C.).
(17) The method for producing the ingredient-containing liquid seasoning according to (16), wherein the ingredient is fruit peel and/or fruit pulp; the cereal powder is at least one selected from soybean curd residue powder, soybean powder, roasted soybean flour, rice powder, cornmeal, and amaranth powder; and the viscosity adjuster is at least one selected from a gum and a modified starch.
(18) The method for producing the ingredient-containing liquid seasoning according to (16) or (17), wherein a content of the water-insoluble powder in the liquid seasoning is 0.05% to 3.0% by mass, and a viscosity measured by a B-type viscometer at ordinary temperature is 500 to 8000 mPa·s.

According to one or more embodiments of the present invention, an ingredient-containing liquid seasoning in which a color tone of an entire seasoning liquid containing an ingredient such as fruit peel and fruit pulp is vivid and which has a presence of ingredients is provided. Since the ingredient-containing liquid seasoning of one or more embodiments of the present invention has turbidity and viscosity as in a grated or pureed seasoning, thick fruit juice feeling is provided even a content of fruit peel or fruit pulp is small. In addition, the ingredient-containing liquid seasoning of one or more embodiments of the present invention is not affected by smell or flavor change originating from water-insoluble powder mixed to the ingredient-containing liquid seasoning together with an ingredient. In addition, since materials whose colors and smells easily change during preservation such as fruit peel, fruit pulp, fruit juices, and vegetable juices do not need to be used in a large amount, occurrence of discoloration and off-flavors caused by said materials during preservation has no effect.

DETAILED DESCRIPTION OF THE EMBODIMENTS

The ingredient-containing liquid seasoning of one or more embodiments of the present invention (hereinafter, referred to as "the liquid seasoning of the present invention") contains (A) an ingredient; (B) water-insoluble powder; (C) at least one selected from a fruit juice, a vegetable juice, and a colorant; and (D) a viscosity adjuster.

<Liquid Seasoning>

The "liquid seasoning" in one or more embodiments of the present invention refers to a seasoning having flowability that is used for bringing out the deliciousness of dishes and food materials. Examples of the liquid seasoning of one or more embodiments of the present invention include tare (Japanese dipping sauce), sauce, tsuyu (Japanese soup broth), ponzu sauce, and a dressing to be poured on vegetables, meat, seafood, or the like for seasoning.

<Ingredient>

In the liquid seasoning of one or more embodiments of the present invention, the "ingredient" refers to a solid ingredient and excludes liquid ingredients such as fruit juices and vegetable juices and paste-like ingredients. The solid ingredient used for the liquid seasoning of one or more embodiments of the present invention may be any of a raw ingredient, a salted ingredient, and a dried ingredient, but a dried ingredient is preferable.

An ingredient mainly used in the liquid seasoning of one or more embodiments of the present invention is not limited as long as it is an ingredient having a vivid color tone but is preferably fruit peel and/or fruit pulp.

In one or more embodiments of the present invention, the "fruit peel" refers to surface skin of a fruit and to a part of a pith. Fruit peel is usually divided into two layers (epicarp and endocarp) or three layers (epicarp, mesocarp, and endocarp). While the number of layers and a thickness, hardness, and the like of each layer differ depend on the type of fruit, a part commonly referred to as an epicarp is used as the fruit peel in one or more embodiments of the present invention. In addition, the "fruit pulp" refers to an edible part existing between the skin and the seed of a fruit, and a part which is usually fleshy or juicy and which is referred to as an endocarp or a mesocarp is used as the fruit pulp in one or more embodiments of the present invention. Fruits are classified into dry fruits, which have dried and hard peel and which are not fleshy, and fleshy fruits, which have succulent or fleshy peel, according to the type of peel. However, fruit peel and/or fruit pulp of any fruit may be used in one or more embodiments of the present invention. In addition, in a case where fruit peel and fruit pulp are used, fruit peel to which fruit pulp attaches may be used.

Examples of a fruit from which the fruit peel and/or the fruit pulp derives used in one or more embodiments of the present invention include lemon, yuzu, sudachi, lime, Mikan, grapefruit, kabosu, bitter orange, orange, apple, pineapple, peach, grape, strawberry, pear, banana, melon, kiwi, cassis, acerola, blueberry, raspberry, persimmon, apricot, guava, plum, mango, papaya, and lychee. Fruit peel and/or fruit pulp of one type or two or more types of the above-described fruits may be used as the fruit peel and/or the fruit pulp. In a case where fruit peel and fruit pulp are used, the fruit peel and the fruit pulp may be derived from the same type of fruit or may be derived from different types of fruits.

While the fruit peel and/or the fruit pulp may be used without being processed, the fruit peel and/or the fruit pulp having been subjected to processing such as drying, crushing, or grounding may be used. For example, processed products such as orange peel and chinpi (a dried product of skin of unshiu mikan) can be used. When the fruit peel and/or the fruit pulp are dried, the fruit peel and/or the fruit pulp may be dried after being cut into a predetermined size or may be cut after being dried. Examples of a drying method include hot air drying, freeze drying, vacuum heat drying, microwave drying, sun drying, and natural drying.

The fruit peel and/or the fruit pulp (hereinafter, also simply referred to as "the ingredient") used in one or more embodiments of the present invention may have any shape such as a rectangular solid, cube (dice), spherical, or granular shape. In addition, a size of the ingredient after swelling in a seasoning liquid is, for example, 1 mm or more, 1 to 10 mm, or 2 to 10 mm from the viewpoint of visually recognizing the color and shape of the ingredient and obtaining a presence of the ingredient but is not particularly limited thereto. Here, the "size" of the ingredient means the longest side length in the case where the ingredient has a rectangular solid shape, means one side length in the case where the ingredient has a cube (dice) shape, means a diameter in the case where the ingredient has a spherical or granular shape, and is a value measured by sampling the ingredient from the liquid seasoning.

The content of the ingredient in the liquid seasoning of one or more embodiments of the present invention is 1% to 60% by mass, 1% to 50% by mass, or 1% to 40% by mass of the total seasoning in terms of wet weight. When the content of the ingredient is less than 1% by mass in terms of wet weight, the ingredient is inconspicuous and a presence of the ingredient is not obtained in the liquid seasoning in a container and in the liquid seasoning after being taken out of the container. In addition, when the content of the ingredient exceeds 60% by mass in terms of wet weight, the ingredient is excessively conspicuous and a balance with a seasoning liquid is poor.

The liquid seasoning of one or more embodiments of the present invention may contain an additional ingredient in addition to the fruit peel and/or the fruit pulp. Examples of the additional ingredient include vegetables (onions, cabbages, Chinese cabbages, carrots, green bell peppers, radishes, radish leaves, beets, lotus roots, burdocks, green onions, Japanese basil leaves, celeries, parsleys, bell peppers (red bell peppers, yellow bell peppers, orange bell peppers, etc.), tomatoes, cucumbers, corns, cauliflowers, eggplants, potatoes, sweet potatoes, taros, yams, pumpkins, etc.), seeds and nuts (almond, peanut, pine nut, coconut, etc.), mushrooms (shimeji mushroom, shiitake mushroom, western mushroom, king oyster mushroom, maitake mushroom, etc.), and beans (soybean, pea, lentil, chickpea, Egyptian bean, etc.). Among these additional ingredients, ingredients having vivid color tones such as carrots, tomatoes, and bell peppers can also be used instead of the fruit peel and/or the fruit pulp. The above-described additional ingredients may be used alone as a single type, or may also be used in any given combination of two or more types at any given ratio.

<Water-Insoluble Powder>

The "water-insoluble powder" in one or more embodiments of the present invention refers to powder which is insoluble in water and is dispersed in a seasoning liquid. While the water-insoluble powder used in one or more embodiments of the present invention is not particularly limited as long as it is edible powder which renders the seasoning liquid cloudy and enhances a vivid color tone peculiar to the fruit peel and/or the fruit pulp thereby and, in a case of a seasoning liquid having a low intensity, increases the intensity to exert the above effect, cereal powder is preferable. Here, cereal crops, which are seeds of gramineous plants, and pulse crops, which are seeds of leguminous plants, are both included in cereals. Accordingly, examples of the cereal powder which can be used in one or more embodiments of the present invention include powder of rice and rice-like cereals, wheat and wheat-like cereals (wheat, barley, naked barley, adlay, *Avena sativa*, rye, oats, etc.), beans (soybean, adzuki bean, common bean, pea, etc.), and miscellaneous cereals (corns, buckwheat, foxtail millet, Japanese barnyard millet, amaranth, etc.), and processed products thereof, and specific examples thereof include soybean curd residue powder, soybean powder, roasted soybean flour, rice powder, cornmeal, and amaranth powder. These water-insoluble powder may be used alone as a single type, or may also be used in any given combination of two or more types at any given ratio.

A content of the water-insoluble powder in the liquid seasoning of one or more embodiments of the present invention is 0.05% to 3.0% by mass, 0.05% to 2.0% by mass, 0.05% to 1.5% by mass, or 0.05% to 0.7% by mass. A content of the water-insoluble powder falling within the above range is preferable because turbidity of a seasoning liquid is sufficient to enhance the vivid color tone peculiar to the fruit peel and/or the fruit pulp and fruit juice feeling is obtained. A content of the water-insoluble powder exceeding 3.0% by mass is not preferable, because a seasoning liquid becomes whitish and fruit juice feeling is lost. In addition, a content of the water-insoluble powder less than 0.05% by mass is not preferable, because sufficient fruit juice feeling is not obtained.

<Fruit Juice, Vegetable Juice, and Colorant>

In one or more embodiments of the present invention, the "fruit juice" refers to a squeezed liquid of a fruit or a liquid part of a fruit obtained by extraction or the like, and when a puree or a grated product obtained by pureeing or grating a fruit is used, refers to a liquid part thereof. Examples of the fruit juice used for the liquid seasoning of one or more embodiments of the present invention include fruit juices derived from lemon, yuzu, sudachi, lime, Mikan, grape fruit, kabosu, bitter orange, orange, apple, pineapple, peach, grape, strawberry, pear, banana, melon, kiwi, cassis, acerola, blueberry, raspberry, persimmon, apricot, guava, plum, mango, papaya, and lychee, etc. Among them, fruit juices of apple, peach, grape, acerola, blueberry, and pear or fruit juices of citruses such as lemon, yuzu, sudachi, lime, Mikan, orange, and grapefruit are more preferable. These fruit juices can be used alone or in combination of two or more types. In addition, the above-described fruit juice can also be used after being subjected to processing such as freezing, concentration, or reduction.

In one or more embodiments of the present invention, the "vegetable juice" refers to a product obtained by crushing or the like a vegetable and squeezing it, and when a puree or a grated product obtained by pureeing or grating a vegetable is used, refers to a liquid part thereof. Examples of the vegetable juice used for the liquid seasoning of one or more embodiments of the present invention include vegetable juices derived from vegetables which can be squeezed, for example, from root vegetables such as onions, radishes, and carrots; fruit vegetables such as tomatoes, green bell peppers, bell peppers, cucumbers, and eggplants; leaf vegetables such as cabbages, lettuces, spinaches, Chinese cabbages, celeries, Japanese Mustard Spinaches, qing geng cai, mulukhiyah, kales, Japanese basil leaves, leeks, and parsleys; stalk vegetables such as asparagus and bamboo shoots; and flower vegetables such as broccolis and cauliflowers. Among them, onions and radishes are more preferable. These vegetable juices can be used alone or in combination of two or more types.

In addition, a colorant may be used in combination with the fruit juice and/or the vegetable juice described above. The colorant is preferably a natural colorant. While the colorant is not particularly limited as long as it is an edible natural colorant including carotenoids, flavonoids, anthocyanins, betacyanins, azaphilones, and porphyrins, examples thereof include a gardenia colorant, a safflower colorant, β-carotene, a turmeric colorant, a marigold colorant, a monascus colorant, beet red, a perilla colorant, a red cabbage colorant, a purple sweet potato colorant, a grape skin colorant, a monascus colorant, a spirulina colorant, and chlorophyll.

<Viscosity Adjuster>

In one or more embodiments of the present invention, the "viscosity adjuster" imparts appropriate viscosity to the liquid seasoning and enhances dispersion of powder, and gums, starch, a modified starch, agar, pectin, cellulose, alginic acid, sodium alginate, carrageenan, etc. can be used, for example. The gums are not particularly limited as long as they are gums utilized as polysaccharide thickeners for foods, and examples thereof include xanthan gum, locust bean gum, gum Arabic, gum Ghatti, guar gum, tamarind gum, karaya gum, gellan gum, and transgant gum, and xanthan gum and locust bean gum are preferable. In addition, a crosslinked starch, esterified starch, etherified starch, oxidized starch, etc. obtained by subjecting a raw starch such as wheat starch, rice starch, potato starch, tapioca starch, and corn starch to crosslinking treatment, esterification treatment, etherification treatment, oxidation treatment, etc. using usual methods can be used as the modified starch, and examples thereof include a hydroxypropylated starch, a hydroxypropylated distarch phosphate, and an acetylated distarch phosphate. A modified starch obtained through physical treatment such as moist heat treatment may be used. Among them, xanthan gum, locust bean gum, and modified starches are preferable from the viewpoints of easiness in availability and easiness in viscosity adjustment. These viscosity adjusters may be used alone as a single type, or may also be used in any given combination of two or more types at any given ratio.

In addition, viscosity of the liquid seasoning in one or more embodiments of the present invention may be 500 mPa·s or more when the viscosity is measured by a B-type viscometer (rotor No. 3, condition of rotational speed: 30 rpm) at ambient temperature (20° C.), but the viscosity is 500 to 8000 mPa·s, 500 to 7000 mPa·s, or 500 to 2000 mPa·s. Here, the "ambient temperature" means 10 to 30° C. and especially means 15 to 25° C. When the viscosity is less than 500 mPa·s, ingredients precipitate to deteriorate dispersion, and the seasoning does not exhibit a sufficient color tone even after the seasoning is taken out of a container. In addition, the viscosity exceeding 8000 mPa·s is not preferable, because it is difficult to take the liquid seasoning out of a container. The above-described viscosity can be usually adjusted by the combination of raw materials, mixing amounts thereof, the viscosity adjuster described above, and the like. In addition, this viscosity can be measured by a viscosity measuring device such as a B-type viscometer.

<Other Raw Materials>

In addition to the above-described raw materials, the liquid seasoning of one or more embodiments of the present invention can contain raw materials for seasoning, etc. used in a common liquid seasoning depending on its type. The liquid seasoning of one or more embodiments of the present invention may be any type of liquid seasonings including an oil-free type which contains no fat/oil, an oil-reduced type in which a fat/oil content is reduced (10% by weight or less), and an oily type which contains fat/oil (including an emulsified type and a separation type). However, an oil-free type is preferable so as not to impair clear and refreshing flavor of the fruit peel and/or the fruit pulp. For example, when the liquid seasoning of one or more embodiments of the present invention is an oil-free type dressing, basic raw materials thereof are generally water, vinegar, sugar (including a high-intensity sweetener), and common salt. In addition to such basic raw materials, taste/flavor components such as a spicy seasoning, a spicy seasoning extract, a flavor oil, an amino acid-based seasoning, a nucleic acid-based seasoning, an organic acid-based seasoning, a fermented seasoning (a flavoring material, an umami seasoning), a liquor, and a flavor; additives such as a stabilizer, a coloring agent, and a calcium salt; and the like may be used in the liquid seasoning of one or more embodiments of the present invention, for example. Contents of these components are not particularly limited, and can be appropriately determined depending on intended use.

Examples of the above-described vinegar include a brewed vinegar produced using a cereal such as rice or wheat or a fruit juice as a main raw material and a synthetic vinegar obtained by adding a seasoning such as sugar to a diluted solution of glacial acetic acid or acetic acid or by adding a brewed vinegar to a diluted solution of glacial acetic acid or acetic acid. Both of the brewed vinegar and the synthetic vinegar can be used in one or more embodiments of the present invention. Examples of the brewed vinegar include grain vinegar (rice vinegar, brown rice vinegar, black vinegar, sake lees vinegar, malt vinegar, adlay vinegar, soybean vinegar, etc.); fruit vinegar (apple vinegar, grape vinegar, lemon vinegar, kabosu vinegar, wine vinegar, balsamic vinegar, etc.); an alcoholic vinegar produced by acetic acid fermentation using ethanol as a raw material; Chinese vinegar; and Sherry vinegar. Examples of the synthetic vinegar include glacial acetic acid or acetic acid appropriately diluted with water. Among them, a brewed vinegar in which an acetic acid content is high, flavor originating from a raw material is weak, and an acetic acid concentration is high is preferable. In addition, these vinegar may be used alone, or may be used in combination of two or more types.

Examples of the above-described sugar include sucrose, maltose, fructose, isomerized glucose syrup, glucose, starch syrup, dextrin, and sugar alcohols such as sorbitol, maltitol, and xylitol. These sugars may be used alone as a single type, or may also be used in any given combination of two or more types at any given ratio.

Examples of the above-described high-intensity sweetener include aspartame, acesulfame potassium, sucralose, neotame, licorice extract, stevia, and an enzyme-treated product thereof. These high-intensity sweeteners may be used alone as a single type, or may also be used in any given combination of two or more types at any given ratio.

The above-described common salt may be directly used, or may also be a food product containing common salt. While the food product containing common salt is not particularly limited, examples thereof include soy sauce, miso (soybean paste), and soup stock. When soy sauce, miso, soup stock, and the like are used, they are used so as not to darken a color of the liquid seasoning to such an extent that the effect of one or more embodiments of the present invention is inhibited.

While the above-described soy sauce is not particularly limited, examples thereof include koikuchi (dark-colored) soy sauce, usukuchi (light-colored) soy sauce, white soy sauce, tamari (rich-tasting) soy sauce, and saishikomi (refermented) soy sauce. These soy sauces may be used alone as a single type, or may also be used in any given combination of two or more types at any given ratio.

While the above-described miso is not particularly limited, examples thereof include barley miso, rice miso, bean miso, and mixed miso as well as aka miso (dark brown miso), shiro miso (white miso), and tanshoku miso (light colored miso), which are named based on the color difference caused by the production method thereof. These miso may be used alone as a single type, or may also be used in any given combination of two or more types at any given ratio.

The above-described spicy seasoning refers to a part of a plant body (the fruit, peel, flower, bud, bark, stalk, leaf, seed, root, rhizome, etc., of a plant) which has a unique flavor, stimulating taste, and color and which is to be mixed into foods and beverages for the purpose of aromatization, deodorization, seasoning, coloration, etc., and the spicy seasoning includes spices or herbs. A spicy seasoning in which its stalk, leaf, and flower are excluded from a part to be utilized is referred to as a spice, and examples of the spice include pepper (black pepper, white pepper, and red pepper), garlic, ginger, sesame (sesame seeds), capsicum, horseradish (*Armoracia rusticana*), mustard, poppy seeds, nutmeg, cinnamon, cardamom, cumin, saffron, allspice, clove, Japanese pepper, fennel, licorice, fenugreek, Dill seed, Sichuan pepper, long pepper, and olive fruit. In addition, a spicy seasoning utilizing its stalk, leave, and flower is referred to as a herb, and examples of the herb include watercress, coriander, Japanese basil, celery, tarragon, chives, chervil, sage, thyme, laurel, leek, parsley, mustard green (*Brassica juncea*), Japanese ginger, mugwort, basil, oregano, rosemary, peppermint, savory, lemon grass, dill, Japanese horseradish leaves, and Japanese pepper leaves.

The above-described spicy seasoning extract is not particularly limited, as long as it is an extract from a food, which is generally displayed as a "spicy seasoning" or a "spice," and examples thereof include capsicum extract, mustard extract, ginger extract, Japanese horseradish extract, pepper extract, garlic extract, onion extract, and Japanese pepper extract. These spicy seasoning extracts may be used alone as a single type, or may also be used in any given combination of two or more types at any given ratio.

Examples of the above-described flavor oil include ginger oil, garlic oil, mustard oil, onion oil, sesame oil, green onion oil, leek oil, Japanese parsley oil, Japanese basil oil, Japanese horseradish oil, lemon oil, seafood oil, and meat oil. These flavor oils may be used alone as a single type, or may also be used in any given combination of two or more types at any given ratio.

Examples of the above-described amino acid-based seasoning include L-sodium glutamate, DL-alanine, glycine, L- or DL-tryptophan, L-phenylalanine, L- or DL-methionine, L-lysine, L-aspartic acid, sodium L-aspartate, and L-arginine. These amino acid-based seasonings may be used alone as a single type, or may also be used in any given combination of two or more types at any given ratio.

Examples of the above-described nucleic acid-based seasoning include disodium 5'-inosinate, disodium 5'-guanylate, disodium 5'-uridylate, disodium 5'-cytidylate, calcium 5'-ribonucleotide, and disodium 5'-ribonucleotide. These nucleic acid-based seasonings may be used alone as a single type, or may also be used in any given combination of two or more types at any given ratio.

Examples of the above-described organic acid-based seasoning include calcium citrate, trisodium citrate, potassium gluconate, sodium gluconate, succinic acid, monosodium succinate, disodium succinate, sodium acetate, potassium DL-hydrogen tartrate, potassium L-hydrogen tartrate, sodium DL-tartrate, sodium L-tartrate, potassium lactate, calcium lactate, sodium lactate, monosodium fumarate, and sodium DL-malate. These organic acid-based seasonings may be used alone as a single type, or may also be used in any given combination of two or more types at any given ratio. The combined use of two or more types of the organic acid-based seasonings is preferable because the tastes of both seasonings are synergistically enhanced.

Examples of the above-described flavoring material include soup stock from dried and smoked bonito, kelp soup stock, vegetable extract, bonito extract, kelp extract, seafood extract, and meat extract. These flavoring materials may be used alone as a single type, or may also be used in any given combination of two or more types at any given ratio.

Examples of the above-described umami seasoning include protein hydrolys ate and yeast extract. These umami seasonings may be used alone as a single type, or may also be used in any given combination of two or more types at any given ratio.

Examples of the above-described liquor include refined sake, synthetic refined sake, mirin (sweet cooking rice wine), Shochu (traditional Japanese distilled spirit), wine, liqueur, and Chinese (Shaoxing) rice wine. These liquors may be used alone as a single type, or may also be used in any given combination of two or more types at any given ratio.

Examples of the above-described flavor include ginger flavor, garlic flavor, mustard flavor, onion flavor, sesame flavor, green onion flavor, leek flavor, Japanese basil flavor, Japanese horseradish flavor, and lemon flavor. These flavors may be used alone as a single type, or may also be used in any given combination of two or more types at any given ratio.

<Production Method of Ingredient-Containing Liquid Seasoning>

The liquid seasoning of one or more embodiments of the present invention can be produced by a production method including a step of putting the above-described raw materials into water and mixing and stirring the resultant mixture while heating the resultant mixture as necessary to obtain a homogeneous liquid. While the mixing and stirring of the raw materials may be performed by a conventional known method, a preferable temperature in the above-described mixing and stirring step is 20° C. to 95° C. When the mixing is performed while heating the mixture, an upper limit of the heating temperature is preferably set at 90° C. so as to suppress change in quality such as flavor and color. The mixed liquid obtained through the above-described mixing and stirring step is filled into a container as in the case of common liquid seasonings directly thereafter or after being subjected to sterilization treatment such as heat sterilization or pressurized sterilization and subsequently being left until a temperature thereof becomes room temperature (15 to 25° C.) or being cooled. While the container used for the liquid seasoning of one or more embodiments of the present invention is not particularly limited in terms of its material or shape, examples thereof include a plastic-made container, a pouch (a polyethylene pouch or an aluminum pouch), a PET bottle, a steel can, an aluminum can, and a bottle container. In addition, the liquid seasoning of one or more embodiments of the present invention may be filled into a container, and then subjected to sterilization treatment such as heat sterilization or retort sterilization to produce a liquid seasoning.

<Use Modes of Ingredient-Containing Liquid Seasoning>

Use modes of the liquid seasoning of one or more embodiments of the present invention are not particularly limited, and the liquid seasoning of one or more embodiments of the present invention can be sprinkled over or mixed with food material such as vegetables, seafood, and meat, or dishes. While the food material or dishes may be any state including a heated state and an unheated state at the time of using the liquid seasoning of one or more embodiments of the present invention, the liquid seasoning of one or more embodiments of the present invention is preferably used for salads, cooked fried food, grilled food (steak, grilled fish), tofu, and the like in their unheated states.

EXAMPLES

Hereinafter, one or more embodiments of the present invention will be more specifically described with examples. However, the present invention is not limited thereto.

(Measurement of Viscosity)

Measurement of the viscosity of a liquid seasoning of a test product prepared in the following test examples was conducted by filling a container for measurement with about 150 cc of a seasoning, adjusting its temperature to 20° C., subsequently setting the container for measurement on a B-type viscometer (manufactured by Told Sangyo Co., Ltd, model name: BMII), and conducting measurement for 20 seconds using a rotor (rotor No. 3, condition of rotational speed: 30 rpm).

(Test Example 1) Studies Regarding Content of Water-Insoluble Powder (1) Preparation of Test Products (Examples 1-1 to 6-1 and Comparative Examples 1-1 to 2-1/Examples 1-2 to 6-2, Comparative Examples 1-2 to 2-2, and Reference Example)

Common raw materials including a brewed vinegar (acidity: 15%), common salt, sugar, and citric acid, water-insoluble powder (soybean curd residue powder), fruit peel (orange peel and chinpi), a fruit juice (Mikan juice), and a viscosity adjuster (distarch phosphate and xanthan gum) were mixed with water according to the mixing amounts (mass %) shown in Table 1-1 and Table 1-2. The resultant mixture was stirred to be homogeneous, subsequently subjected to sterilization treatment at 80° C. for five minutes, and filled into a bottle to prepare an ingredient-containing liquid seasoning as a test product.

(2) Sensory Evaluation Test

With respect to the ingredient-containing liquid seasoning of each of the test products, sensory evaluations in terms of "color tone" and "presence of ingredients" were carried out on the liquid seasoning in a container. In addition, about 4.5 ml of the liquid seasoning was taken out and put on a white plate at ambient temperature, and sensory evaluations in terms of "color tone" and "presence of ingredients" were carried out on the liquid seasoning after being taken out. Each sensory evaluation was carried out with a total of five inspectors trained for the sensory evaluation, in accordance with the following evaluation criteria. In calculating the score in each evaluation item, a weighted average was calculated from the evaluation scores obtained by the five inspectors, and the obtained value was rounded off to two decimal places. A score of 3 points in five-point evaluation was set as a passing mark (regarded as having an effect), a score of 3.5 points, which was higher than 3 points, was regarded as having a good effect, a score of 4 points or higher was regarded as having a better effect, and a score of 4.5 points or higher was regarded as having the best effect. A test product in which a score of any one of the evaluation items was less than 3 points was regarded as an unacceptable product. In addition, with respect to a test product in Table 1-1 and a test product in Table 1-2 which had the same water-insoluble powder content and different fruit juice contents (for example, Example 1-1 and Example 1-2), a test product in which a score of every evaluation item for both test products was 3 points or higher was regarded as an acceptable product.

(Color Tone of Seasoning in Container)
  5: Preferable as turbidity is appropriate and "fruit juice feeling" is high.
  4: Preferable as turbidity and "fruit juice feeling" are provided.
  3: Turbidity and "fruit juice feeling" are provided.
  2: Turbidity is low and "fruit juice feeling" is weak, or turbidity is high and "fruit juice feeling" is weak.
  1: No turbidity is provided, or turbidity is too high and no "fruit juice feeling" is felt.

(Presence of Ingredients in Container)
  5: Ingredients are conspicuous in liquid and a presence of ingredients is provided.
  4: Ingredients are slightly conspicuous in liquid.
  3: A presence of ingredients in liquid is recognized.
  2: A presence of ingredients in liquid is hardly recognized, and there is a little presence of ingredients.
  1: Ingredients are almost inconspicuous in liquid.

(Color Tone of Seasoning After Being Taken Out of Container)
  5: Preferable as turbidity is appropriate and "fruit juice feeling" is high.
  4: Preferable as turbidity and "fruit juice feeling" are provided.
  3: Turbidity and "fruit juice feeling" are provided.
  2: Turbidity is low and "fruit juice feeling" is weak, or turbidity is high and "fruit juice feeling" is weak.
  1: No turbidity is provided, or turbidity is too high and no "fruit juice feeling" is felt.

(Presence of Ingredients After Being Taken Out of Container)
  5: Ingredients are conspicuous in liquid and a presence of ingredients is provided.
  4: Ingredients are slightly conspicuous in liquid.
  3: A presence of ingredients in liquid is recognized.
  2: A presence of ingredients in liquid is hardly recognized, and there is a little presence of ingredients.
  1: Ingredients are almost inconspicuous in liquid.

(3) Preservation Test

The ingredient-containing liquid seasonings of the test products were preserved at 10° C. or 50° C. for four days and then returned to ambient temperature. Samples preserved at 50° C. were evaluated in terms of changes in color of the liquid seasonings in containers and the liquid seasonings after being taken out of containers compared to samples preserved at 10° C. The evaluation was carried out with a total of five inspectors trained for the sensory evaluation, in accordance with the following criteria. In calculating the score in each evaluation item, a weighted average was calculated from the evaluation scores obtained by the five inspectors, and the obtained value was rounded off to two decimal places. Scores of three points or higher were regarded as being within an allowable range.

(Change in Color of Seasoning in Container)
  5: There is no change in color at all.
  4: There is almost no change in color.
  3: There is a slight change in color.
  2: There is a change in color.
  1: There is a significant change in color.

(Change in Color of Seasoning After Being Taken Out of Container)
  5: There is no change in color at all.
  4: There is almost no change in color.
  3: There is a slight change in color.
  2: There is a change in color.
  1: There is a significant change in color.

(4) Test Results

Results of the respective tests described above and viscosity measurement values of the test products are shown in Table 1-1 and Table 1-2.

TABLE 1-1

|  | Examples | | | | | |
| --- | --- | --- | --- | --- | --- | --- |
|  | 1-1 | 2-1 | 3-1 | 4-1 | 5-1 | 6-1 |
| <Raw materials (mass %)> | | | | | | |
| Brewed vinegar (acidity: 15%) | 4.3 | 4.3 | 4.3 | 4.3 | 4.3 | 4.3 |
| Common salt | 3.6 | 3.6 | 3.6 | 3.6 | 3.6 | 3.6 |
| Sugar | 3.0 | 3.0 | 3.0 | 3.0 | 3.0 | 3.0 |
| Orange peel | 3.0 | 3.0 | 3.0 | 3.0 | 3.0 | 3.0 |
| Chinpi | 0.2 | 0.2 | 0.2 | 0.2 | 0.2 | 0.2 |
| Mikan juice (five-fold concentrated) | 1.2 | 1.2 | 1.2 | 1.2 | 1.2 | 1.2 |
| Distarch phosphate | 1.6 | 1.6 | 1.6 | 1.6 | 1.6 | 1.6 |
| Xanthan gum | 0.3 | 0.3 | 0.3 | 0.3 | 0.3 | 0.3 |
| Citric acid | 0.8 | 0.8 | 0.8 | 0.8 | 0.8 | 0.8 |
| Water-insoluble powder (soybean curd residue powder) | 0.05 | 0.2 | 0.4 | 0.7 | 1.5 | 2.0 |
| Water | Appropriate amount | Appropriate amount | Appropriate amount | Appropriate amount | Appropriate amount | Appropriate amount |
| Total | 100 | 100 | 100 | 100 | 100 | 100 |
| Viscosity (mPa·s) | 1064 | 1064 | 1176 | 1240 | 1400 | 1460 |
| <Sensory evaluation> | | | | | | |
| Color tone of seasoning in container | 4.4 | 4.0 | 5.0 | 4.8 | 3.4 | 3.0 |
| Presence of ingredients in container | 4.4 | 4.6 | 4.6 | 4.6 | 3.6 | 3.2 |
| Color tone of seasoning after being taken out of container | 4.0 | 3.6 | 4.2 | 4.6 | 4.4 | 4.0 |
| Presence of ingredients after being taken out of container | 4.6 | 4.6 | 4.8 | 4.6 | 4.0 | 3.8 |
| <Preservation test (50° C., four days)> | | | | | | |
| Change in color (in container) | 4.2 | 4.4 | 4.6 | 4.8 | 4.2 | 4.0 |
| Change in color (after being taken out of container) | 5.0 | 4.6 | 4.8 | 4.6 | 4.4 | 4.0 |

|  | Comparative Examples | | Reference |
| --- | --- | --- | --- |
|  | 1-1 | 2-1 | Example |
| <Raw materials (mass %)> | | | |
| Brewed vinegar (acidity: 15%) | 4.3 | 4.3 | 4.5 |
| Common salt | 3.6 | 3.6 | 3.5 |
| Sugar | 3.0 | 3.0 | 3.0 |
| Orange peel | 3.0 | 3.0 | 3.0 |
| Chinpi | 0.2 | 0.2 | 0.3 |
| Mikan juice (five-fold concentrated) | 1.2 | 1.2 | 5.0 |
| Distarch phosphate | 1.6 | 1.6 | 1.5 |
| Xanthan gum | 0.3 | 0.3 | 0.3 |
| Citric acid | 0.8 | 0.8 | 0.8 |
| Water-insoluble powder (soybean curd residue powder) | 0.0 | 5.0 | 0.0 |
| Water | Appropriate amount | Appropriate amount | Appropriate amount |
| Total | 100 | 100 | 100 |
| Viscosity (mPa·s) | 1064 | 2672 | 1180 |
| <Sensory evaluation> | | | |
| Color tone of seasoning in container | 3.0 | 1.6 | 4.2 |
| Presence of ingredients in container | 3.6 | 2.6 | 3.6 |
| Color tone of seasoning after being taken out of container | 3.0 | 1.8 | 3.6 |
| Presence of ingredients after being taken out of container | 3.6 | 2.2 | 3.6 |
| <Preservation test (50° C., four days)> | | | |
| Change in color (in container) | 3.6 | 4.0 | 3.6 |
| Change in color (after being taken out of container) | 4.0 | 3.4 | 3.6 |

TABLE 1-2

| | Examples | | | | | |
|---|---|---|---|---|---|---|
| | 1-2 | 2-2 | 3-2 | 4-2 | 5-2 | 6-2 |
| <Raw materials (mass %)> | | | | | | |
| Brewed vinegar (acidity: 15%) | 4.3 | 4.3 | 4.3 | 4.3 | 4.3 | 4.3 |
| Common salt | 3.6 | 3.6 | 3.6 | 3.6 | 3.6 | 3.6 |
| Sugar | 3.0 | 3.0 | 3.0 | 3.0 | 3.0 | 3.0 |
| Orange peel | 3.0 | 3.0 | 3.0 | 3.0 | 3.0 | 3.0 |
| Chinpi | 0.2 | 0.2 | 0.2 | 0.2 | 0.2 | 0.2 |
| Mikan juice (five fold concentrated) | 0.6 | 0.6 | 0.6 | 0.6 | 0.6 | 0.6 |
| Distarch phosphate | 1.6 | 1.6 | 1.6 | 1.6 | 1.6 | 1.6 |
| Xanthan gum | 0.3 | 0.3 | 0.3 | 0.3 | 0.3 | 0.3 |
| Citric acid | 0.8 | 0.8 | 0.8 | 0.8 | 0.8 | 0.8 |
| Water-insoluble powder (soybean curd residue powder) | 0.05 | 0.2 | 0.4 | 0.7 | 1.5 | 2.0 |
| Water | Appropriate amount | Appropriate amount | Appropriate amount | Appropriate amount | Appropriate amount | Appropriate amount |
| Total | 100 | 100 | 100 | 100 | 100 | 100 |
| Viscosity (mPa · s) | 1180 | 1120 | 1160 | 1176 | 1600 | 1500 |
| <Sensory evaluation> | | | | | | |
| Color tone of seasoning in container | 3.6 | 3.8 | 4.2 | 3.6 | 3.4 | 3.0 |
| Presence of ingredients in container | 4.4 | 4.0 | 4.2 | 4.2 | 3.6 | 3.6 |
| Color tone of seasoning after being taken out of container | 3.8 | 4.0 | 4.6 | 4.8 | 4.0 | 3.6 |
| Presence of ingredients after being taken out of container | 4.0 | 4.4 | 4.6 | 4.8 | 3.6 | 3.6 |
| <Preservation test (50° C., four days)> | | | | | | |
| Change in color (in container) | 4.2 | 4.4 | 4.6 | 4.8 | 4.4 | 4.2 |
| Change in color (after being taken out of container) | 4.6 | 4.8 | 4.8 | 4.8 | 3.8 | 4.0 |

| | Comparative Examples | | Reference |
|---|---|---|---|
| | 1-2 | 2-2 | Example |
| <Raw materials (mass %)> | | | |
| Brewed vinegar (acidity: 15%) | 4.3 | 4.3 | 4.5 |
| Common salt | 3.6 | 3.6 | 3.5 |
| Sugar | 3.0 | 3.0 | 3.0 |
| Orange peel | 3.0 | 3.0 | 3.0 |
| Chinpi | 0.2 | 0.2 | 0.3 |
| Mikan juice (five fold concentrated) | 0.6 | 0.6 | 5.0 |
| Distarch phosphate | 1.6 | 1.6 | 1.5 |
| Xanthan gum | 0.3 | 0.3 | 0.3 |
| Citric acid | 0.8 | 0.8 | 0.8 |
| Water-insoluble powder (soybean curd residue powder) | 0.0 | 5.0 | 0.0 |
| Water | Appropriate amount | Appropriate amount | Appropriate amount |
| Total | 100 | 100 | 100 |
| Viscosity (mPa · s) | 1136 | 2664 | 1180 |
| <Sensory evaluation> | | | |
| Color tone of seasoning in container | 2.8 | 1.6 | 4.2 |
| Presence of ingredients in container | 3.6 | 2.2 | 3.6 |
| Color tone of seasoning after being taken out of container | 2.8 | 2.2 | 3.6 |
| Presence of ingredients after being taken out of container | 3.4 | 1.8 | 3.6 |
| <Preservation test (50° C., four days)> | | | |
| Change in color (in container) | 3.6 | 4.4 | 3.6 |
| Change in color (after being taken out of container) | 4.2 | 3.6 | 3.6 |

As shown in Table 1-1 (fruit juice content: 1.2% by mass) and Table 1-2 (fruit juice content: 0.6% by mass), the ingredient-containing liquid seasonings of Examples 1-1 to 6-1 and Examples 1-2 to 6-2, each of which had a water-insoluble powder content within a range of 0.05% to 3.0% by mass, each had a good color tone as a liquid seasoning, had fruit juice feeling, and had a presence of ingredients in both cases where the ingredient-containing liquid seasonings were in containers and after being taken out of the containers regardless of fruit juice contents thereof. In addition, the colors of the liquid seasonings in the containers and the colors of the liquid seasonings after being taken out of the containers were not changed even after preservation. On the other hand, the liquid seasonings of Comparative Example 1-1 and Comparative Example 1-2, each of which had a water-insoluble powder content of less than 0.05% by mass, did not provide sufficient fruit juice feeling and a presence of ingredients in both cases where the ingredient-containing liquid seasonings were in containers and had been taken out of the containers; and in the liquid seasonings of Comparative Example 2-1 and Comparative Example 2-2, each of which had a water-insoluble powder content exceeding 3.0% by mass, turbidity of the seasoning liquid was too high and fruit juice feeling was lost. In addition, with respect to smell, all of the liquid seasonings of Examples and Comparative Examples were good as no odor derived from the water-insoluble powder was observed, and off-flavors caused by deterioration of the fruit juice or fruit peel or off-flavors derived from the water-insoluble powder were hardly observed even after preservation. On the other hand, the liquid seasoning of Reference Example, in which the fruit juice was used at a relatively large amount to impart fruit juice feeling, had a decreased color tone and a weaker presence of ingredients compared to the liquid seasonings of Examples, and off-flavors derived from the fruit juice were recognized after preservation.

(Test Example 2) Studies Regarding Type and Content of Viscosity Adjuster (1) Preparation of Test Products (Examples 7 to 14 and Comparative Example 3)

Common raw materials including a brewed vinegar (acidity: 15%), common salt, and sugar, water-insoluble powder (soybean curd residue powder), fruit peel (orange peel and chinpi), a fruit juice (Mikan juice), and a viscosity adjuster (xanthan gum, locust bean gum, tamarind gum, pectin, agar, distarch phosphate, hydroxypropylated starch) were mixed with water according to the mixing amounts (mass %) shown in Table 2. The resultant mixture was stirred to be homogeneous, subsequently subjected to sterilization treatment at 80° C. for five minutes, and filled into a bottle to prepare an ingredient-containing liquid seasoning as a test product.

(2) Sensory Evaluation Test

With respect to the ingredient-containing liquid seasoning of each of the test products, sensory evaluation in terms of "color tone" and "presence of ingredients" on the liquid seasoning in a container and "color tone" and "presence of ingredients" on the liquid seasoning after being taken out of the container was carried out in the same manner as in Test Example 1.

(3) Preservation Test

With respect to the ingredient-containing liquid seasoning of each of the test products, changes in color of the liquid seasoning in a container and the liquid seasoning after being taken out of the container were evaluated in the same manner as in Test Example 1.

(4) Test Results

Results of the respective tests described above and viscosity measurement values of the test products are shown in Table 2.

TABLE 2

| | | Examples | | | | |
|---|---|---|---|---|---|---|
| | | 7 | 8 | 9 | 10 | 11 |
| <Raw materials (mass %)> | | | | | | |
| Brewed vinegar (acidity: 15%) | | 4.3 | 4.3 | 4.3 | 4.3 | 4.3 |
| Common salt | | 3.7 | 3.7 | 3.7 | 3.7 | 3.7 |
| Sugar | | 3.0 | 3.0 | 3.0 | 3.0 | 3.0 |
| Orange peel | | 3.0 | 3.0 | 3.0 | 3.0 | 3.0 |
| Chinpi | | 0.2 | 0.2 | 0.2 | 0.2 | 0.2 |
| Mikan juice (five-fold concentrated) | | 1.2 | 1.2 | 1.2 | 1.2 | 1.2 |
| Viscosity adjuster | Xanthan gum | 0.15 | 0.3 | 0.4 | 0.3 | 0.1 |
| | Locust bean gum | — | — | — | — | 0.01 |
| | Tamarind gum | — | — | — | — | — |
| | Pectin | — | — | — | 0.1 | — |
| | Agar | — | — | — | — | — |
| | Distarch phosphate | 1.6 | 1.6 | — | — | — |
| | Hydroxypropylated starch | — | — | — | — | 2.0 |
| Water-insoluble powder (soybean curd residue powder) | | 0.7 | 0.7 | 0.7 | 0.7 | 0.7 |
| Water | | Appropriate amount | Appropriate amount | Appropriate amount | Appropriate amount | Appropriate amount |
| Total | | 100 | 100 | 100 | 100 | 100 |
| Viscosity (mPa · s) | | 514 | 1252 | 720 | 520 | 632 |
| <Sensory evaluation> | | | | | | |
| Color tone of seasoning in container | | 5.0 | 4.8 | 4.6 | 5.0 | 4.8 |
| Presence of ingredients in container | | 4.4 | 4.4 | 4.4 | 4.4 | 4.6 |
| Color tone of seasoning after being taken out of container | | 4.6 | 4.6 | 4.4 | 4.6 | 4.4 |
| Presence of ingredients after being taken out of container | | 4.8 | 4.8 | 4.8 | 4.2 | 4.2 |

TABLE 2-continued

| <Preservation test (50° C., four days)> | | | | | |
|---|---|---|---|---|---|
| Change in color (in container) | 4.2 | 4.4 | 3.8 | 4.2 | 4.4 |
| Change in color (after being taken out of container) | 4.6 | 4.8 | 4.6 | 4.2 | 4.2 |

| | | Examples | | Comparative Examples |
|---|---|---|---|---|
| | 12 | 13 | 14 | 3 |
| <Raw materials (mass %)> | | | | |
| Brewed vinegar (acidity: 15%) | 4.3 | 4.3 | 4.3 | 4.3 |
| Common salt | 3.7 | 3.7 | 3.7 | 3.7 |
| Sugar | 3.0 | 3.0 | 3.0 | 3.0 |
| Orange peel | 3.0 | 3.0 | 3.0 | 3.0 |
| Chinpi | 0.2 | 0.2 | 0.2 | 0.2 |
| Mikan juice (five-fold concentrated) | 1.2 | 1.2 | 1.2 | 1.2 |
| Viscosity adjuster — Xanthan gum | 0.2 | — | — | 0.07 |
| Locust bean gum | — | — | — | — |
| Tamarind gum | — | 0.1 | — | — |
| Pectin | — | — | — | — |
| Agar | 0.1 | — | — | — |
| Distarch phosphate | — | 1.6 | 1.6 | — |
| Hydroxypropylated starch | 3.5 | 3.0 | 10.3 | — |
| Water-insoluble powder (soybean curd residue powder) | 0.7 | 0.7 | 0.7 | 0.7 |
| Water | Appropriate amount | Appropriate amount | Appropriate amount | Appropriate amount |
| Total | 100 | 100 | 100 | 100 |
| Viscosity (mPa · s) | 7700 | 6320 | 645 | 125 |
| <Sensory evaluation> | | | | |
| Color tone of seasoning in container | 4.6 | 4.4 | 4.2 | 4.8 |
| Presence of ingredients in container | 4.4 | 4.2 | 4.0 | — |
| Color tone of seasoning after being taken out of container | 4.4 | 4.8 | 4.0 | 4.6 |
| Presence of ingredients after being taken out of container | 4.6 | 4.4 | 3.8 | — |
| <Preservation test (50° C., four days)> | | | | |
| Change in color (in container) | 4.0 | 4.0 | 4.2 | 4.2 |
| Change in color (after being taken out of container) | 4.4 | 4.2 | 4.0 | 4.0 |

As shown in Table 2, the ingredient-containing liquid seasonings of Examples 7 to 14, each of which had a viscosity of 500 mPa·s or more, each had a good color tone as a liquid seasoning, had fruit juice feeling, and had a presence of ingredients in both cases where the ingredient-containing liquid seasonings were in containers and after being taken out of the containers. In addition, the colors of the liquid seasonings in the containers and the colors of the liquid seasonings after being taken out of the containers were not changed even after preservation. On the other hand, in the liquid seasoning of Comparative Example 3, which had a viscosity of less than 500 mPa·s, dispersion of soybean curd residue powder was poor and the powder tended to precipitate, and an objective liquid seasoning could not be obtained. In addition, with respect to smell, all of the liquid seasonings of Examples and Comparative Example were good as no odor derived from the water-insoluble powder was observed, and off-flavors caused by deterioration of the fruit juice or fruit peel or off-flavors derived from the water-insoluble powder were hardly observed even after preservation.

(Test Example 3) Studies Regarding Type of Material Imparting Turbidity (1) Preparation of Test Products (Examples 15 to 17 and Comparative Examples 4 to 6)

Common raw materials including a brewed vinegar (acidity: 15%), common salt, sugar, and citric acid, a material capable of imparting turbidity to a seasoning liquid (soybean curd residue powder, rice powder, roasted soybean powder, powdered skim milk, apple puree, or emulsified flavor), fruit peel (orange peel and chinpi), a fruit juice (Mikan juice), and a viscosity adjuster (distarch phosphate and xanthan gum) were mixed with water according to the mixing amounts (mass %) shown in Table 3. The resultant mixture was stirred to be homogeneous, subsequently subjected to sterilization treatment at 80° C. for five minutes, and filled into a bottle to prepare an ingredient-containing liquid seasoning as a test product.

(2) Sensory Evaluation Test

With respect to the ingredient-containing liquid seasoning of each of the test products, sensory evaluation in terms of "color tone" and "presence of ingredients" on the liquid seasoning in a container and "color tone" and "presence of ingredients" on the liquid seasoning after being taken out of the container was carried out in the same manner as in Test Example 1.

(3) Preservation Test

With respect to the ingredient-containing liquid seasoning of each of the test products, changes in color of the liquid seasoning in a container and the liquid seasoning after being taken out of the container were evaluated in the same manner as in Test Example 1.

(4) Test Results

Results of the respective tests described above and viscosity measurement values of the test products are shown in Table 3.

tion of the fruit juice or fruit peel or off-flavors derived from the water-insoluble powder were hardly observed even after preservation. On the other hand, although the liquid seasonings using powdered skim milk (Comparative Example 4), apple puree (Comparative Example 5), and emulsified flavor (Comparative Example 6), respectively, could impart turbidity to seasonings, an effect equivalent to the case of the water-insoluble powder such as soybean curd residue powder could not be obtained therefrom in terms of a color tone of a liquid seasoning and a presence of ingredients in both cases where the ingredient-containing liquid seasonings were in containers and after being taken out of the containers. Especially in the case of apple puree, the color was significantly changed, and preservability was poor; and in

TABLE 3

| | | | Examples | | | Comparative Examples | |
|---|---|---|---|---|---|---|---|
| | | 15 | 16 | 17 | 4 | 5 | 6 |
| <Raw materials (mass %)> | | | | | | | |
| Brewed vinegar (acidity: 15%) | | 4.3 | 4.3 | 4.3 | 4.3 | 4.3 | 4.3 |
| Common salt | | 3.7 | 3.7 | 3.7 | 3.7 | 3.7 | 3.7 |
| Sugar | | 3.0 | 3.0 | 3.0 | 3.0 | 3.0 | 3.0 |
| Orange peel | | 3.0 | 3.0 | 3.0 | 3.0 | 3.0 | 3.0 |
| Chinpi | | 0.2 | 0.2 | 0.2 | 0.2 | 0.2 | 0.2 |
| Mikan juice (five-fold concentrated) | | 1.2 | 1.2 | 1.2 | 1.2 | 1.2 | 1.2 |
| Distarch phosphate | | 1.6 | 1.6 | 1.6 | 1.6 | 1.6 | 1.6 |
| Xanthan gum | | 0.3 | 0.3 | 0.3 | 0.3 | 0.3 | 0.3 |
| Citric acid | | 0.8 | 0.8 | 0.8 | 0.8 | 0.8 | 0.8 |
| Turbid material | Soybean curd residue powder | 0.7 | — | — | — | — | — |
| | Rice powder | — | 0.9 | — | — | — | — |
| | Roasted soybean powder | — | — | 0.6 | — | — | — |
| | Powdered skim milk | — | — | — | 0.3 | — | — |
| | Apple puree | — | — | — | — | 9.6 | — |
| | Emulsified flavor | — | — | — | — | — | 0.2 |
| Water | | Appropriate amount | Appropriate amount | Appropriate amount | Appropriate amount | Appropriate amount | Appropriate amount |
| Total | | 100 | 100 | 100 | 100 | 100 | 100 |
| Viscosity (mPa · s) | | 1210 | 1490 | 1280 | 1184 | 1560 | 1140 |
| <Sensory evaluation> | | | | | | | |
| Color tone of seasoning in container | | 4.6 | 4.2 | 4.6 | 3.8 | 4.2 | 3.8 |
| Presence of ingredients in container | | 4.4 | 4.2 | 3.8 | 3.8 | 3.6 | 4.0 |
| Color tone of seasoning after being taken out of container | | 4.8 | 4.2 | 4.4 | 3.4 | 4.6 | 3.6 |
| Presence of ingredients after being taken out of container | | 4.0 | 4.2 | 4.0 | 4.0 | 3.6 | 3.8 |
| <Preservation test (50° C., four days)> | | | | | | | |
| Change in color (in container) | | 4.2 | 3.4 | 3.8 | 3.8 | 3.0 | 3.8 |
| Change in color (after being taken out of container) | | 5.0 | 4.2 | 3.2 | 4.0 | 2.4 | 4.0 |

As shown in Table 3, each of the liquid seasonings using soybean curd residue powder (Example 15), rice powder (Example 16), and roasted soybean powder (Example 17), respectively, as water-insoluble powder had a good color tone as a liquid seasoning, had fruit juice feeling, and had a presence of ingredients in both cases where the ingredient-containing liquid seasonings were in containers and after being taken out of the containers. In addition, the colors of the liquid seasonings in the containers and the colors of the liquid seasonings after being taken out of the containers were not changed even after preservation. Furthermore, with respect to smell, all of the liquid seasonings of Examples were good as no odor derived from the water-insoluble powder was observed, and off-flavors caused by deterioration of the fruit juice or fruit peel or off-flavors derived from the water-insoluble powder were hardly observed even after preservation. On the other hand, although the liquid seasonings using powdered skim milk (Comparative Example 4), apple puree (Comparative Example 5), and emulsified flavor (Comparative Example 6), respectively, could impart turbidity to seasonings, an effect equivalent to the case of the water-insoluble powder such as soybean curd residue powder could not be obtained therefrom in terms of a color tone of a liquid seasoning and a presence of ingredients in both cases where the ingredient-containing liquid seasonings were in containers and after being taken out of the containers. Especially in the case of apple puree, the color was significantly changed, and preservability was poor; and in the cases of powdered skim milk and emulsified flavor, while color changes were acceptable, deterioration smell was recognized.

(Test Example 4) Studies Regarding Type of Ingredient (1) Preparation of Test Products (Examples 18 to 22)

Common raw materials including a brewed vinegar (acidity: 15%), common salt, and sugar, water-insoluble powder (soybean curd residue powder), various types of ingredients and fruit juices having different color tones, and a viscosity adjuster (distarch phosphate and xanthan gum) were mixed with water according to the mixing amounts (mass %) shown in Table 4. The resultant mixture was stirred to be homogeneous, subsequently subjected to sterilization treatment at 80° C. for five minutes, and filled into a bottle to prepare an ingredient-containing liquid seasoning as a test product.

(2) Sensory Evaluation Test

With respect to the ingredient-containing liquid seasoning of each of the test products, sensory evaluation in terms of "color tone" and "presence of ingredients" on the liquid seasoning in a container and "color tone" and "presence of ingredients" on the liquid seasoning after being taken out of the container was carried out in the same manner as in Test Example 1.

(3) Preservation Test

With respect to the ingredient-containing liquid seasoning of each of the test products, changes in color of the liquid seasoning in a container and the liquid seasoning after being taken out of the container were evaluated in the same manner as in Test Example 1.

(4) Test Results

Results of the respective tests described above and viscosity measurement values of the test products are shown in Table 4.

TABLE 4

| | | Examples | | | | |
|---|---|---|---|---|---|---|
| | | 18 | 19 | 20 | 21 | 22 |
| <Raw materials (mass %)> | | | | | | |
| Brewed vinegar | | 4.3 | 4.3 | 4.3 | 4.3 | 4.3 |
| Common salt | | 3.7 | 3.7 | 3.7 | 3.7 | 3.7 |
| Sugar | | 3.0 | 3.0 | 3.0 | 3.0 | 3.0 |
| Fruit | Mango pulp | 4.1 | — | — | — | — |
| ingredients | Pineapple pulp | 4.1 | — | — | — | — |
| Orange color | Mikan juice (five-fold concentrated) | 2.7 | — | — | — | — |
| Fruit | Raspberry pulp | — | 4.1 | — | — | — |
| ingredients | Blueberry juice (six and a half-fold concentrated) | — | 1.4 | — | — | — |
| Red color | | | | | | |
| Fruit | Kiwi pulp | — | — | 6.8 | — | — |
| ingredients | Parsley | — | — | 0.1 | — | — |
| Green color | Gardenia colorant | — | — | 0.1 | — | — |
| Vegetable ingredients | Carrot ingredients | — | — | — | 4.1 | — |
| Orange color | | | | | | |
| | Onion ingredients | — | — | — | 0.4 | — |
| | Red bell pepper | — | — | — | 0.3 | — |
| | Carrot juice | — | — | — | 1.4 | — |
| Vegetable | Tomato pulps (solid) | — | — | — | — | 0.4 |
| ingredients | Tomato puree | — | — | — | — | 13.6 |
| Red color | Onion ingredients | — | — | — | — | 0.4 |
| | Red bell pepper | — | — | — | — | 0.4 |
| Distarch phosphate | | 1.6 | 1.6 | 1.6 | 1.6 | 1.6 |
| Xanthan gum | | 0.3 | 0.3 | 0.3 | 0.3 | 0.3 |
| Water-insoluble powder (soybean curd residue powder) | | 0.7 | 0.7 | 0.7 | 0.7 | 0.7 |
| Water | | Appropriate amount | Appropriate amount | Appropriate amount | Appropriate amount | Appropriate amount |
| Total | | 100 | 100 | 100 | 100 | 100 |
| Viscosity (mPa · s) | | 1824 | 1576 | 1152 | 1920 | 1380 |
| <Sensory evaluation> | | | | | | |
| Color tone of seasoning in container | | 4.4 | 3.8 | 4.8 | 4.4 | 4.4 |
| Presence of ingredients in container | | 3.6 | 4.2 | 4.2 | 4.2 | 3.8 |
| Color tone of seasoning after being taken out of container | | 4.2 | 4.4 | 4.8 | 4.4 | 4.4 |
| Presence of ingredients after being taken out of container | | 3.4 | 4.2 | 4.2 | 3.8 | 3.8 |
| <Preservation test (50° C., four days)> | | | | | | |
| Change in color (in container) | | 3.6 | 3.0 | 4.2 | 5.0 | 4.4 |
| Change in color (after being taken out of container) | | 3.8 | 3.4 | 3.8 | 4.6 | 4.2 |

As shown in Table 4, the ingredient-containing liquid seasonings, each of which contained water-insoluble powder at a predetermined amount, each had a good color tone as a liquid seasoning, had fruit juice feeling, and had a presence of ingredients in both cases where the ingredient-containing liquid seasonings were in containers and after being taken out of the containers even types of ingredients (fruits and vegetables) and fruit juices were changed. In addition, the colors of the liquid seasonings in the containers and the colors of the liquid seasonings after being taken out of the containers were not changed even after preservation (Examples 18 to 22). Furthermore, with respect to smell, all of the liquid seasonings of Examples were good as no odor derived from the water-insoluble powder was observed, and off-flavors caused by deterioration of the fruit juice or fruit peel or off-flavors derived from the water-insoluble powder were hardly observed even after preservation.

One or more embodiments of the present invention can be utilized in the field of manufacturing liquid seasonings such as dressing.

All publications, patents, and patent applications cited in the present description are incorporated herein by reference in their entirety.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. A liquid seasoning, comprising:
  (A) a solid ingredient selected from the group consisting of fruit peel, fruit pulp, and combination thereof;
  (B) a water-insoluble powder selected from the group consisting of soybean curd residue powder, soybean powder, roasted soybean flour, rice powder, cornmeal, amaranth powder, and combinations thereof;
  (C) a component selected from the group consisting of a fruit juice, a vegetable juice, a colorant, and combinations thereof; and
  (D) a viscosity adjuster;
  wherein the liquid seasoning has a viscosity of at least 514 mPa·s when measured by a B-type viscometer at ambient temperature, and
  wherein the water-insoluble powder in the liquid seasoning is 0.05% to 3.0% by mass.
2. The liquid seasoning according to claim 1, wherein the viscosity adjuster is selected from the group consisting of a gum, a modified starch, and combinations thereof.

* * * * *